United States Patent

Iwamoto et al.

[11] Patent Number: 5,439,857
[45] Date of Patent: Aug. 8, 1995

[54] DIELECTRIC CERAMIC COMPOSITION

[75] Inventors: Sakiko Iwamoto, Nagaokakyo; Harunobu Sano, Kyoto; Yukio Hamaji, Nagaokakyo; Kunisaburo Tomono, Ohtsu, all of Japan

[73] Assignee: Murata Manufacturing Co., Ltd., Kyoto, Japan

[21] Appl. No.: 268,819

[22] Filed: Jun. 30, 1994

[30] Foreign Application Priority Data

Jun. 30, 1993 [JP] Japan .................. 5-188777
Jun. 30, 1993 [JP] Japan .................. 5-188778
Jun. 30, 1993 [JP] Japan .................. 5-188779

[51] Int. Cl.$^6$ ............................. C04B 35/26
[52] U.S. Cl. ................................... 501/136
[58] Field of Search .......................... 501/136

[56] References Cited

U.S. PATENT DOCUMENTS

| | | | |
|---|---|---|---|
| 4,582,814 | 4/1986 | Thomas | 501/136 |
| 4,601,989 | 7/1986 | Sakabe et al. | 501/136 |
| 4,661,462 | 4/1987 | Sakabe et al. | 501/136 |
| 4,744,972 | 5/1988 | Ogata et al. | 501/134 |
| 4,749,668 | 6/1988 | Fujino et al. | 501/136 |
| 4,985,381 | 1/1991 | Mori et al. | 501/136 |
| 5,079,197 | 1/1992 | Ushida et al. | 501/136 |
| 5,219,810 | 6/1993 | Furuya et al. | 501/136 |

FOREIGN PATENT DOCUMENTS

| | | | |
|---|---|---|---|
| 3541517 | 5/1986 | Germany . | |
| 60042277 | 11/1983 | Japan | 501/134 |
| 60-033261 | 2/1985 | Japan | 501/134 |
| 60-036371 | 2/1985 | Japan | 501/134 |
| 60-046965 | 3/1985 | Japan | 501/134 |
| 61-128409 | 6/1986 | Japan . | |
| 62-188250 | 5/1987 | Japan . | |
| 0474519 | 6/1975 | U.S.S.R. | 501/134 |
| 0504736 | 2/1976 | U.S.S.R. | 501/134 |

*Primary Examiner*—David Brunsman
*Attorney, Agent, or Firm*—Ostrolenk, Faber, Gerb & Soffen

[57] ABSTRACT

A dielectric ceramic composition consists essentially of a main component of a four component system, $Pb(Mg_{\frac{1}{3}}Nb_{\frac{2}{3}})O_3$—$PbTiO_3$—$Pb(Ni_{\frac{1}{3}}Nb_{\frac{2}{3}})O_3$—$Pb(Zn_{\frac{1}{2}}W_{\frac{1}{2}})O_3$, of which a part of Pb is replaced with at least one substituent selected from the group consisting of Ba, Ca and Sr; and a secondary component selected from the group consisting of W, Zn and Mg. The secondary component is incorporated in the main component in an amount of 0.05 to 10.0 parts by weight per 100 parts by weight of the main component in terms of each oxide, $WO_3$, ZnO or MgO. The main component consists essentially of 4.0 to 93.0 mol % of $Pb(Mg_{\frac{1}{3}}Nb_{\frac{2}{3}})O_3$, 1.5 to 35.0 mol % of $PbTiO_3$, 1.5 to 51.0 mol % of $Pb(Ni_{\frac{1}{3}}Nb_{\frac{2}{3}})O_3$, and 1.0 to 34.0 mol % of $Pb(Zn_{\frac{1}{2}}W_{\frac{1}{2}})O_3$, the amount of at least one substituent for Pb being 0.1 to 10 mol %.

13 Claims, 1 Drawing Sheet

DIELECTRIC CERAMIC COMPOSITION

BACKGROUND OF THE INVENTION

1. Field of the Invention

The present invention relates to a dielectric ceramic composition and, more particularly, to a ceramic composition useful as a dielectric material for monolithic ceramic capacitors.

2. Description of the Prior Art

As a high permittivity material for ceramic capacitors, there have widely been used those mainly comprising $BaTiO_3$ and containing an additive such as $BaSnO_3$, $CaZrO_3$ and $SrTiO_3$ incorporated therein because of their high dielectric constant ranging from 2000 to 15000.

However, these dielectric materials have such a disadvantage that they have a high sintering temperature of 1300° to 1400° C. This results in an increase in the cost required for sincering. In addition, when producing monolithic capacitors with such a dielectric material, it is required to use a material for internal electrodes which does not melt, oxidize, or react with the dielectric material at a high temperature of more than 1300° C. since monolithic ceramic capacitor are produced by the steps of preparing ceramic green sheets, forming an internal electrode layer on each ceramic green sheet, bonding a plurality of green sheets by thermocompression, and firing the resultant multilayered green ceramic body. Accordingly, noble metals such as palladium and platinum have widely been used as a material for internal electrodes of the monolithic ceramic capacitors. However, the use of the noble metals has become a bar to reduction of the cost of monolithic ceramic capacitors since the greater part of the cost thereof is occupied by the internal electrodes.

To solve such problems, it has been proposed to incorporate a vitreous material containing oxides of B, Bi and Pb into a $BaTiO_3$-based dielectric ceramic composition to lower the sintering temperature. The dielectric ceramic composition containing such a vitreous material makes it possible to use relatively inexpensive Ag-Pd alloys as a material for internal electrodes of monolithic ceramic capacitors since it can be sintered at a low temperature of 1100° to 1150° C. However, the incorporation of the vitreous material causes such a problem that the dielectric constant lowers, resulting in an increase in size of the monolithic ceramic capacitors. Accordingly, the advantages of the use of the inexpensive electrode material is cancelled.

In addition, the monolithic ceramic capacitors comprising the $BaTiO_3$-based dielectric ceramic composition have such a problem that the capacitance thereof is affected greatly by a biasing electric field of a direct current. For example, the capacitance is lowered about 30 to 80% of the initial value by applying a high direct current voltage of 5 kV per 1 mm thickness of the dielectric layer.

To solve such problems, many investigations have been made on lead-based complex perovskites mainly comprising lead because of their low temperature sintering. Some lead-based complex perovskites have been already known to be dielectric ceramic compositions having a relative dielectric constant of more than 10000 and a sintering temperature of 1050° C. or below. However, a problem of these compositions is that they cause a large temperature coefficient of capacitance.

SUMMARY OF THE INVENTION

It is therefore a main object of the present invention to provide a dielectric ceramic composition which has a high dielectric constant equal to or more than 10000, a small change rate of capacitance with applied DC voltage, and a good temperature coefficient of capacitance which meets requirements of E characteristics defined by Japanese Industrial Standard (JIS), and a low sintering temperature equal to or less than 1050° C.

The above and other objects of the present invention are achieved by providing a dielectric ceramic composition consisting essentially of:

a main component of a four component system, $Pb(Mg_{\frac{1}{3}}Nb_{\frac{2}{3}})O_3$—$PbTiO_3$—$Pb(Ni_{\frac{1}{3}}Nb_{\frac{2}{3}})O_3$—$Pb(Zn_{\frac{1}{2}}W_{\frac{1}{2}})O_3$, of which a part of Pb is replaced with at least one substituent selected from the group consisting of Ba, Ca and Sr, said main component consisting essentially of 4.0 to 93.0 mol % of $Pb(Mg_{\frac{1}{3}}/Nb_{\frac{2}{3}})O_3$, 1.5 to 35.0 mol % of $PbTiO_3$, 1.5 to 51.0 mol % of $Pb(Ni_{\frac{1}{3}}Nb_{\frac{2}{3}})O_3$, and 1.0 to 34.0 mol % of $Pb(Zn_{\frac{1}{2}}W_{\frac{1}{2}})O_3$, the amount of said at least one substituent for Pb being 0.1 to 10 mol %; and a secondary component selected from the group consisting of w, Zn and Mg, said secondary component being incorporated in said main component in an amount of 0.05 to 10.0 parts by weight per 100 parts by weight of said main component in terms of each oxide, $WO_3$, ZnO or MgO.

The above main component may be expressed by the general formula:

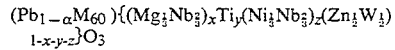

where M is a substituent selected from the group consisting of Ba, Ca and Sr, $0.001 \leq \alpha \leq 0.100$, $0.040 \leq x \leq 0.930$, $0.015 \leq y \leq 0.350$, and $0.015 \leq z \leq 0.510$; in short,

where A represents $(Pb_{1-\alpha}M_{60})$, B represents $\{(Mg_{\frac{1}{3}}Nb_{\frac{2}{3}})_x Ti_y (Ni_{\frac{1}{3}}Nb_{\frac{2}{3}})_z (Zn_{\frac{1}{2}}W_{\frac{1}{2}})_{1-x-y-z}\}$, and M in $(Pb_{1-60}M_{60})$ is a substituent selected from the group consisting of Ba, Ca and Sr, $0.001 \leq \alpha \leq 0.100$, $0.040 \leq x \leq 0.930$, $0.015 \leq y \leq 0.350$, and $0.015 \leq z \leq 0.510$.

However, the molar ratio of the A site to the B site, i.e., A/B in the main component is not necessarily required to be the stoichiometric value. It may take a value in the range of 0.99 to 1.03 inclusive.

Thus, the general formula of the above main component may be rewritten as follows:

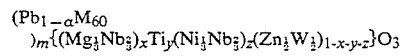

where M is a substituent selected from the group consisting of Ba, Ca and Sr, $0.001 \leq \alpha \leq 0.100$, $0.040 \leq x \leq 0.930$, $0.015 \leq y \leq 0.350$, $0.015 \leq Z \leq 0.510$, and $0.99 \leq m \leq 1.03$.

If W is used as the secondary component, it is preferred to incorporate it into the main component in an amount of 0.05 to 8.0 parts by weight in terms of $WO_3$ per 100 parts by weight of the main component. Accordingly, there is provided a dielectric ceramic composition consisting essentially of a main component of a four component system, $Pb(Mg_{\frac{1}{3}}Nb_{\frac{2}{3}})O_3$—$PbTiO_3$—$Pb(Ni_{\frac{1}{3}}Nb_{\frac{2}{3}})O_3$—$Pb(Zn_{\frac{1}{2}}W_{\frac{1}{2}})O_3$, of which a part of Pb is substituted by at least one substituent selected from the group consisting of Ba, Ca and Sr, said main component consisting essentially of 4.0 to 93.0 mol % of $Pb(Mg_{\frac{1}{3}}Nb_{\frac{2}{3}})O_3$, 1.5 to 35.0 mol % of $PbTiO_3$ 1.5 to 51.0 mol % of $Pb(Ni_{\frac{1}{3}}Nb_{\frac{2}{3}})O_3$, and 1.0 to 34.0 mol % of $Pb(Zh_{\frac{1}{2}}W_{\frac{1}{2}})O_3$, the amount of said at least one substituent for Pb being 0.1 to 10 mol %; and a secondary component composed of W and incorporated in said main component in an amount of 0.05 to 8.0 parts by weight per 100 parts by weight of said main component in terms of $WO_3$.

If zn is used as the secondary component, it is preferred to incorporate it into the main component in an amount of 0.1 to 10.0 parts by weight in terms of ZnO per 100 parts by weight of the main component. Accordingly, there is further provided a dielectric ceramic composition consisting essentially of a main component of a four component system, $Pb(Mg_{\frac{1}{3}}Nb_{\frac{2}{3}})O_3$—$PbTiO_3$—$Pb(Ni_{\frac{1}{3}}Nb_{\frac{2}{3}})O_3$—$Pb(Zn_{\frac{1}{2}}W_{\frac{1}{2}})O_3$, of which a part of Pb is substituted by at least one substituent selected from the group consisting of Ba, Ca and St, said main component consisting essentially of 4.0 to 93.0 mol % of $Pb(Mg_{\frac{1}{3}}Nb_{\frac{2}{3}})O_3$, 1.5 to 35.0 mol % of $PbTiO_3$, 1.5 to 51.0 mol % of $Pb(Ni_{\frac{1}{3}}Nb_{\frac{2}{3}}))_3$, and 1.0 to 34.0 mol % of $Pb(Zn_{\frac{1}{2}}W_{\frac{1}{2}})O_3$, the amount of said at least one substituent for Pb being 0.1 to 10 mol %; and a secondary component composed of Zn and incorporated in said main component in an amount of 0.1 to 10.0 parts by weight per 100 parts by weight of said main component in terms of ZnO.

If Mg is used as the secondary component, it is preferred to incorporate it into the main component in an amount of 0.05 to 5.0 parts by weight in terms of MgO per 100 parts by weight of the main component. Accordingly, there is further provided a dielectric ceramic composition consisting essennially of a main component of a four component system, $Pb(Mg_{\frac{1}{3}}Nb_{\frac{2}{3}})O_3$—$PbTiO_3$—$Pb(Ni_{\frac{1}{3}}Nb_{\frac{2}{3}})O_3$—$Pb(Zn_{\frac{1}{2}}W_{\frac{1}{2}})O_3$, of which a part of Pb is substituted by at least one substituent selected from the group consisting of Ba, Ca and St, said main component consisting essentially of 4.0 to 93.0 mol % of $Pb(Mg_{\frac{1}{3}}Nb_{\frac{2}{3}})O_3$, 1.5 to 35.0 mol % of $PbTiO_3$, 1.5 to 51.0 mol % of $Pb(Ni_{\frac{1}{3}}Nb_{\frac{2}{3}})O_3$, and 1.0 to 34.0 mol % of $Pb(Zn_{\frac{1}{2}}W_{\frac{1}{2}})O_3$, the amount of said at least one substituent for Pb being 0.1 to 10 mol %; and a secondary component composed of Mg and incorporated in said main component in an amount of 0.01 to 5.00 parts by weight per 100 parts by weight of said main component in terms of MgO.

In a preferred embodiment, the above dielectric ceramic composition contains Mn as a secondary component along with W, Zn or Mg in an amount of 0.5 parts by weight per 100 parts by weight of said main component in terms of $MnO_2$.

The reasons why the main component has been limited to those having a composition defined as above are as follows:

If the content of $Pb(Mg_{\frac{1}{3}}Nb_{\frac{2}{3}})O_3$ is less than 4.0 mol %, the dielectric constant becomes less than 10000 and the dielectric dissipation factor (tan δ) becomes more than 2.0 %. If the content of $Pb(Mg_{\frac{1}{3}}Nb_{\frac{2}{3}})O_3$ exceeds 93.0 mol %, the temperature coefficient of capacitance becomes worse, though the dielectric constant becomes large. For these reasons, the content of $Pb(Mg_{\frac{1}{3}}Nb_{\frac{2}{3}})O_3$ has been limited to 4.0 to 93.0 mol %.

If the content of $PbTiO_3$ is less than 1.5 mol %, the dielectric constant decreases considerably and becomes less than 10000. If the content of $PbTiO_3$ exceeds 35.0 mol %, the dielectric constant becomes low and the dielectric dissipation factor becomes more than 2.0 %. For these reasons, the content of $PbTiO_3$ has been limited to 1.5 to 35.0 mol %.

If the content of $Pb(Ni_{\frac{1}{3}}Nb_{\frac{2}{3}})O_3$ is less than 1.5 mol %, the temperature coefficient of capacitance does not meet the requirements of E characteristics defined by JIS, though the dielectric constant becomes large. If the content of $Pb(Ni_{\frac{1}{3}}Nb_{\frac{2}{3}})O_3$ is more than 51.0 mol %, the dielectric constant becomes less than 10000. Thus, the content of $Pb(Ni_{\frac{1}{3}}Nb_{\frac{2}{3}})O_3$ has been limited to 1.5 to 51.0 mol %.

If the content of $Pb(Zn_{\frac{1}{2}}W_{\frac{1}{2}})O_3$ is less than 1.0 mol %, the sintering temperature becomes higher than 1050° C. and the dielectric constant becomes less than 10000. If the content of $Pb(Zn_{\frac{1}{2}}W_{\frac{1}{2}})O_3$ is more than 34.0 mol %, the dielectric constant becomes less than 10000 and the specific resistance becomes less than $10^{12}$ Ω·cm at room temperature, though the sintering temperature becomes less than 1050° C. Thus, the content of $PbZn_{\frac{1}{2}}W_{\frac{1}{2}})O_3$ has been limited to 1.0 to 34.0 mol %.

A part of Pb in the main components is replaced with 0.1 to 10 mol % of at least one element selected from the group consisting of Ba, Ca and Sr to prevent formation of pyrochlore phase, whereby producing a dielectric ceramic composition with a high dielectric constant, a high insulation resistance, a small temperature coefficient of capacitance and high mechanical property. If the amount of the substituent is less than 0.1 mol %, the dielectric dissipation factor becomes higher than 2.0%. If the amount of the substituent is more than 10.0 mol %, the sintering temperature becomes higher than 1050° C., the temperature coefficient of capacitance does not meet the requirement of E characteristics, and the dielectric constant becomes less than 10000. Thus, the amount of the substituent has been limited to 0.1 to 10.0 mol %.

The secondary component, W, Zn and Mg is incorporated into the main component to improve the dielectric properties. The reasons why the secondary component has been limited to those defined as above are as follows:

If the content of Zn is less than 0.1 parts by weight in terms of ZnO, the dielectric constant becomes less than 10000. If the content of Zn is more than 10.0 parts by weight in terms of ZnO, the temperature characteristics does not meet the E regulation and the specific resistance becomes less than $10^{12}$ Ω·cm, though the dielectric constant becomes large. Thus, the content of Zn has been limited to 0.1 to 10.0 parts by weight per 100 parts by weight of the main component in terms of ZnO.

If the content of W is less than 0.05 parts by weight in terms of $WO_3$, the dielectric constant becomes less than 10000. If the content of W is more than 8.0 parts by weight in terms of $WO_3$, the temperature characteristics does not meet the E regulation and the specific resistance becomes less than $10^{12}$ Ω·cm, though the dielectric constant becomes large. Thus, the content of W has been limited to 0.05 to 8.0 parts by weight per 100 parts by weight of the main component in terms of $WO_3$.

If the content of Mg is less than 0.05 parts by weight in terms of MgO, the dielectric constant becomes less than 10000. If the content of Mg is more than 5.00 parts by weight in terms of MgO, the temperature coefficient of capacitance does not meet the requirements of E characteristics difined by JIS and the specific resistance becomes less than $10^{12}$ Ω·cm, though the dielectric constant becomes large. Thus, the content of Mg has been limited to 0.05 to 5.00 parts by weight per 100 parts by weight of the main component in terms of MgO.

Mn is incorporated into the main component to improve the insulation resistance at room temperature and elevated temperatures, as the occasion demands. However, if the content of Mn is more than 0.5 parts by weight in terms of $MnO_2$, the specific resistance becomes less than $10^{12}$ Ω·cm at room temperature.

The molar ratio of the A site to the B site, i.e., m (=A/B) in the above main component has been limited to 0.99 to 1.03 for the following reasons. If the ratio A/B is less than 0.99, the sintering temperature becomes more than 1050° C. and the dielectric constant becomes less than 10000. If the ratio A/B is more than 1.03, the dielectric dissipation factor becomes greater than 2.0% and the temperature coefficient of capcitance does not meet the requirements of E characteristics defined by JIS.

The dielectric ceramic composition of the present invention has a high dielectric constant of not more than 10000, a low dielectric loss of not more than 2% a high specific resistance of $10^{12}$ Ω·cm at room temperature, and a low sintering temperature of not more than 1050° C. It has a small temperature coefficient of capacitance which meets E characteristics defined by JIS over a temperature range of −25° C. to +85° C., i.e., it has a temperature coefficient of capacitance ranging from +20% to −55% over a temperature range of −25° C. to +85° C. In addition, the dielectric ceramic composition is small in voltage dependency, excellent in mechanical strength and high in reliability.

Accordingly, the dielectric ceramic composition of the present invention can be used as a dielectric material not only for general ceramic capacitors but also for monolithic ceramic capacitors. Further, it is possible to use inexpensive Ag-Pd alloys as a material for internal electrodes because of its low sintering temperature, thus making it possible to produce monolithic ceramic capacitors which are small in size but large in capacitance.

The above and other objects, features and advantages of the present invention will become apparent from the following description in connection with several examples.

EXAMPLE 1

As raw materials, there were used PbO, NiO, $Nb_2O_5$, $TiO_2$, ZnO, $WO_3$, MgO, $BaCO_3$, $SrCO_3$, $CaCO_3$ and $MnO_2$ with a purity of not less than 99.9%. These raw materials were weighed and mixed in proportions shown in Table 1 to prepare mixture for a dielectric ceramic composition.

The resultant mixture (100 g) was placed in a polyethylene pot along with agate balls and milled by the wet process for 10 hours. The slurry obtained was dehydrated, dried, and then put into an alumina sagget to calcine it at 650° to 800° C. for 2 hours.

The resultant calcined powder was crushed, added with 3 parts by weight of polyvinyl alcohol, milled again by the wet process, dried and then passed through a screen with 60 meshes to obtain granules for molding. The resultant granules were molded with an oil press under a pressure of 2000 Kg/cm² to prepare ceramic green disks with a diameter of 10 mm and a thickness of 1.0 mm.

The green disks were placed in an alumina sagger with zirconia powder spread over its bottom, heated in air at 400° C. for 4 hours to remove the organic binder by combustion, and then fired at a sintering temperature shown in Table 2 for 2 hours to obtain ceramic disks. The ceramic disks were provided on its both sides with ellvet electrodes by applying a silver paste containing lead borosilicate glass frit and then baking it at 750° C. for 10 minutes to prepare specimens for measurements of electrical properties.

For each specimen, measurements were made on capacitance (C), dielectric loss (tan δ) and insulation resistance (IR). The dielectric constant and dielectric loss were measured at 1 kHz, 1 Vrms at 25° C. The insulation resistance (IR) was measured after applying a DC voltage of 500 V for 2 minutes. The dielectric constant (ε) and specific resistance (ρ) were determined, using data for capacitance, insulation resistance (IR), a thickness of the specimen and a surface area of the electrodes. Results are shown in Table 2.

In Tables 1 and 2, specimens with an asterisk (*) are those out of the scope of the present invention.

TABLE 1

| No. | $Pb(Mg_{\frac{1}{3}}Nb_{\frac{2}{3}})O_3$ (mol %) | $PbTiO_3$ (mol %) | $Pb(Ni_{\frac{1}{3}}Nb_{\frac{2}{3}})O_3$ (mol %) | $Pb(Zn_{\frac{1}{2}}W_{\frac{1}{2}})O_3$ (mol %) | Substitant | (mol %) | Secondary component (wt %) ZnO | $MnO_2$ |
|---|---|---|---|---|---|---|---|---|
| 1* | 3.0 | 13.0 | 50.0 | 34.0 | Ba | 0.5 | 1.00 | 0.0 |
| 2 | 78.5 | 19.0 | 1.5 | 1.0 | Sr | 1.5 | 8.00 | 0.0 |
| 3 | 93.0 | 4.0 | 2.0 | 1.0 | Ca | 8.0 | 8.00 | 0.0 |
| 4 | 48.3 | 15.5 | 21.7 | 14.5 | Sr | 5.5 | 4.00 | 0.0 |
| 5* | 37.3 | 1.0 | 36.7 | 25.0 | Ba | 6.5 | 2.00 | 0.0 |
| 6* | 4.0 | 36.0 | 51.0 | 9.0 | Ca | 8.5 | 3.00 | 0.0 |
| 7 | 36.3 | 32.5 | 18.7 | 12.5 | Sr | 10.0 | 4.00 | 0.0 |
| 8 | 4.0 | 11.0 | 51.0 | 34.0 | Ba | 1.5 | 0.10 | 0.0 |
| 9 | 47.3 | 18.0 | 21.2 | 13.5 | Ca | 1.0 | 3.50 | 0.0 |
| 10* | 96.0 | 1.5 | 1.5 | 1.0 | Sr | 6.0 | 10.00 | 0.0 |
| 11 | 60.0 | 19.0 | 11.0 | 10.0 | Ba | 5.5 | 5.00 | 0.0 |
| 12* | 79.5 | 19.0 | 0.5 | 1.0 | Ca | 7.5 | 4.00 | 0.0 |
| 13 | 51.3 | 17.5 | 18.7 | 12.5 | Sr | 1.0 | 7.00 | 0.0 |
| 14 | 53.8 | 15.0 | 18.7 | 12.5 | Ba | 3.5 | 0.50 | 0.0 |
| 15 | 36.0 | 1.5 | 37.5 | 25.0 | Ba | 4.5 | 6.00 | 0.0 |
| 16* | 37.0 | 2.0 | 56.0 | 5.0 | Ba | 9.5 | 1.50 | 0.0 |
| 17* | 15.0 | 34.2 | 50.0 | 0.8 | Ca | 6.0 | 0.10 | 0.0 |
| 18* | 23.0 | 30.0 | 10.0 | 37.0 | Sr | 7.0 | 8.50 | 0.0 |
| 19* | 78.5 | 19.0 | 1.5 | 1.0 | Sr | 2.0 | 0.00 | 0.0 |
| 20* | 92.0 | 4.0 | 3.0 | 1.0 | Ca | 10.0 | 11.00 | 0.0 |
| 21 | 44.3 | 17.0 | 23.2 | 15.5 | Ca | 5.0 | 5.00 | 0.1 |
| 22 | 44.3 | 17.0 | 23.2 | 15.5 | Sr | 5.0 | 5.00 | 0.2 |
| 23 | 44.3 | 17.0 | 23.2 | 15.5 | Ba | 5.0 | 5.00 | 0.5 |

TABLE 1-continued

| No. | Pb(Mg₁/₃Nb₂/₃)O₃ (mol %) | PbTiO₃ (mol %) | Pb(Ni₁/₃Nb₂/₃)O₃ (mol %) | Pb(Zn₁/₂W₁/₂)O₃ (mol %) | Substitant (mol %) | | Secondary component (wt %) | |
|---|---|---|---|---|---|---|---|---|
| | | | | | | | ZnO | MnO₂ |
| 24* | 44.3 | 17.0 | 23.2 | 15.5 | Sr | 5.0 | 5.00 | 1.0 |
| 25* | 60.0 | 19.0 | 11.0 | 10.0 | — | — | 5.00 | 0.0 |
| 26* | 60.0 | 19.0 | 11.0 | 10.0 | Ba | 11.0 | 5.00 | 0.0 |
| 27* | 60.0 | 19.0 | 11.0 | 10.0 | Sr | 10.5 | 5.00 | 0.0 |
| 28* | 60.0 | 19.0 | 11.0 | 10.0 | Ca | 10.5 | 5.00 | 0.0 |

TABLE 2

| No. | Sinter temp. (°C.) | ($\epsilon$) | tan$\delta$ (%) | specific resistance ($\Omega \cdot$ cm) | | TCC(%) | |
|---|---|---|---|---|---|---|---|
| | | | | 25° C. | 85° C. | $-25°$ C. | $-85°$ C. |
| 1* | 970 | 8400 | 2.7 | $8.0 \times 10^{11}$ | $6.6 \times 10^{9}$ | $-33$ | $-48$ |
| 2 | 990 | 13000 | 1.8 | $9.1 \times 10^{11}$ | $8.9 \times 10^{12}$ | $-50$ | $-25$ |
| 3 | 1000 | 14900 | 1.0 | $2.5 \times 10^{13}$ | $1.1 \times 10^{12}$ | $-45$ | $-55$ |
| 4 | 980 | 12400 | 0.8 | $8.7 \times 10^{12}$ | $5.0 \times 10^{11}$ | $-38$ | $-43$ |
| 5* | 970 | 8000 | 0.3 | $7.8 \times 10^{12}$ | $6.5 \times 10^{11}$ | $-34$ | $-47$ |
| 6* | 970 | 7000 | 3.0 | $7.3 \times 10^{12}$ | $5.3 \times 10^{11}$ | $-23$ | $-53$ |
| 7 | 970 | 10600 | 0.6 | $8.8 \times 10^{12}$ | $9.5 \times 10^{11}$ | $-22$ | $-55$ |
| 8 | 960 | 11500 | 1.8 | $2.0 \times 10^{12}$ | $9.1 \times 10^{10}$ | $-37$ | $-52$ |
| 9 | 990 | 13000 | 0.6 | $9.5 \times 10^{12}$ | $9.3 \times 10^{11}$ | $-30$ | $-51$ |
| 10* | 1100 | 17800 | 1.0 | $3.1 \times 10^{13}$ | $1.1 \times 10^{12}$ | $-37$ | $-65$ |
| 11 | 990 | 12700 | 1.9 | $2.7 \times 10^{13}$ | $1.2 \times 10^{12}$ | $-46$ | $-44$ |
| 12* | 1000 | 15800 | 2.0 | $9.6 \times 10^{11}$ | $8.0 \times 10^{11}$ | $-56$ | $-42$ |
| 13 | 980 | 15500 | 1.0 | $8.2 \times 10^{12}$ | $2.3 \times 10^{11}$ | $-38$ | $-50$ |
| 14 | 980 | 14300 | 0.9 | $8.6 \times 10^{12}$ | $8.1 \times 10^{10}$ | $-36$ | $-54$ |
| 15 | 970 | 12600 | 1.4 | $4.5 \times 10^{12}$ | $7.6 \times 10^{10}$ | $-36$ | $-54$ |
| 16* | 1000 | 6600 | 0.6 | $7.1 \times 10^{12}$ | $5.3 \times 10^{10}$ | $-24$ | $-50$ |
| 17* | 1120 | 8100 | 2.0 | $8.3 \times 10^{12}$ | $2.9 \times 10^{11}$ | $-48$ | $-22$ |
| 18* | 920 | 8200 | 2.0 | $9.7 \times 10^{10}$ | $1.0 \times 10^{9}$ | $-45$ | $-34$ |
| 19* | 1000 | 8400 | 1.4 | $7.9 \times 10^{12}$ | $7.1 \times 10^{9}$ | $-46$ | $-26$ |
| 20* | 1000 | 15100 | 0.8 | $1.0 \times 10^{10}$ | $8.9 \times 10^{9}$ | $-20$ | $-58$ |
| 21 | 990 | 14300 | 0.9 | $3.1 \times 10^{13}$ | $5.7 \times 10^{12}$ | $-30$ | $-55$ |
| 22 | 990 | 15200 | 0.7 | $3.2 \times 10^{13}$ | $6.0 \times 10^{12}$ | $-31$ | $-55$ |
| 23 | 990 | 13800 | 0.6 | $2.9 \times 10^{13}$ | $5.2 \times 10^{12}$ | $-34$ | $-52$ |
| 24* | 990 | 14200 | 1.0 | $1.2 \times 10^{11}$ | $4.1 \times 10^{10}$ | $-34$ | $-50$ |
| 25* | 960 | 14400 | 2.4 | $1.5 \times 10^{13}$ | $9.1 \times 10^{11}$ | $-51$ | $-39$ |
| 26* | 1100 | 8900 | 1.2 | $3.5 \times 10^{13}$ | $1.5 \times 10^{12}$ | $-21$ | $-56$ |
| 27* | 1050 | 9300 | 1.3 | $3.2 \times 10^{13}$ | $1.6 \times 10^{12}$ | $-20$ | $-56$ |
| 28* | 1050 | 9400 | 1.3 | $3.0 \times 10^{13}$ | $1.4 \times 10^{12}$ | $-20$ | $-57$ |

As will be understood from the data shown in Tables 1 and 2, all the specimens comprising the dielectric ceramic composition according to the present invention have a high dielectric constant of more than 10000, and a low dielectric dissipation factor (tan $\delta$) of not higher than 2.0%. Further, they meet the E characteristics defined by JIS even though they have a high dielectric constant. In addition, they have a sintering temperature of less than 1000° C., thus making it possible to fire them at a low temperature.

In contrast therewith, a composition with the content of Pb(Mg₁/₃Nb₂/₃)O₃ less than 4.0 mol %, like as the specimen No. 1, provides a low dielectric constant of less than 10000 and a high dielectric dissipation factor exceeding 2.0%. Further, the composition with the content of Pb(Mg₁/₃Nb₂/₃)O₃ exceeding 93.0 mol %, like specimen No. 10, is poor in the temperature coefficient of capacitance, though it has a high dielectric constant.

The composition with a content of PbTiO₃ less than 1.5 mol %, like as specimen No. 5, provides a low dielectric constant less than 10000. The composition with a content of PbTiO₃ exceeding 35.0 mol %, like as specimen No. 6, provides a low dielectric constant and a high dielectric dissipation factor of more than 2.0%.

In case of the composition with a content of Pb(Ni₁/₃Nb₂/₃)O₃ less than 1.5 mol %, like specimen No. 12, the temperature coefficient of capacitance does not meet the requirements of E characteristics defined by JIS, though the dielectric constant becomes large. The composition with a content of Pb(Ni₁/₃Nb₂/₃)O₃ more than 51.0 mol %, like a specimen No. 16, provides a low dielectric constant of less than 10000.

The composition with a content of Pb(Zn₁/₂W₁/₂)O₃ less than 1.0 mol %, like specimen No. 17, has a sintering temperature higher than 1000° C. and provides a low dielectric constant less than 10000. The composition with a content of Pb(Zn₁/₂W₁/₂)O₃ is more than 34.0 mol %, like specimen No. 18, provides a low dielectric constant less than 10000 and a low specific resistance less than $10^{12}$ $\Omega$·cm at room temperature, though its sintering temperature is less than 1000° C.

The composition containing the substituent content of less than 0.1 mol %, like specimen No. 25, provides a high dielectric dissipation factor exceeding 2.0%. The composition containing the substituent content of exceeding 10.0 mol %, like as specimens Nos. 26, 27 and 28, has a high sintering temperature more than 1000° C. and provides a low dielectric constant less than 10000 and poor temperature coefficient of capacitance which does not meet the requirements of E characteristics defined by JIS.

The composition with a content of Zn less than 0.1 parts by weight in terms of ZnO, like as specimen No. 19, provides a low dielectric constant less than 10000. The composition with a content of Zn more than 10.0 parts by weight in terms of ZnO, like specimen No. 20, provides poor temperature characteristics which does not meet the E regulation, and a low specific resistance less than $10^{12}$ $\Omega$·cm, though it provides a high dielectric constant.

Finally, the composition with a content of Mn exceeding 0.5 parts by weight in terms of $MnO_2$, like specimen No. 24, provides a low specific resistance less than $10^{12}$ Ω·cm at room temperature.

EXAMPLE 2

Using the calcined powder prepared in Example 1 for the specimens Nos. 11 and 25, there were prepared monolithic ceramic capacitors in the following manner. Each calcined powder was crushed, added with a suitable amount of an organic binder of polyvinyl butyral resin and ethyl alcohol, milled with a ball mill by the wet process, and then formed into rectangular ceramic green sheets of a 20 μm thick by the Doctor blade process.

The ceramic green sheets were respectively provided on both sides thereof with a conductive layer for an internal electrode by screen printing with a conductive paste containing Ag as a conductive material. Subsequently, a plurality of the printed green sheets were stacked, bonded by thermo-compression, and then cut no prepare green chips for monolithic ceramic capacitors. The resultant green chips were fired in air at a temperature shown in Table 3 for 2 hours.

Each capacitor chip was provided on its opposite edges with external electrodes by applying a silver paste and then baking it at 750° C. for 10 minutes to prepare a specimen of a monolithic ceramic capacitor.

The dimensions of the monolithic ceramic capacitors are: 1.6 mm in width, 3.2 mm in length, 1.2 mm in thickness, and 13 μm in thickness of dielectric layer. The number of dielectric layers is 10, and effective surface area of internal electrode is 2.1 mm².

For each specimen, measurements were made on capacitance (C), dielectric dissipation factor (tan δ), insulation resistance (IR), deflection strength and change rate of capacitance.

The capacitance (C) and dielectric dissipation factor (tan δ) were measured at 1 KHz, 1 Vrms at 25° C. with a self-balancing bridge type measuring instrument. The specimen was applied with a DC voltage of 25 V for 2 minutes to measure insulation resistance (IR). The insulation resistance was measured with an insulation resistance tester before and after a humidity aging test. The humidity aging test was carried out in an atmosphere with a humidity of 95% at 80° C. for 1000 hours. The insulation resistance is given in Table 3 as the product of capacitance (C) multiplied by insulation resistance (IR), i.e., CR.

BRIEF DESCRIPTION OF THE DRAWING

The bending strength was measured with a deflection strength measuring instrument 10 shown in FIG. 1, which the load is applied to a test specimen 12 put on a specimen holder 14 by a loading pin 16 and the load applied is indicated by a tension gage 18 with an indicating needle. A gap between the tools of the specimen holder 14 was set to 2 mm.

The change rate of capacitance was determined by applying a DC voltage of 25 V to the specimen along with a AC voltage of 1 kHz, 1 Vrms. Results are shown in Table 3.

TABLE 3

Figure 1:
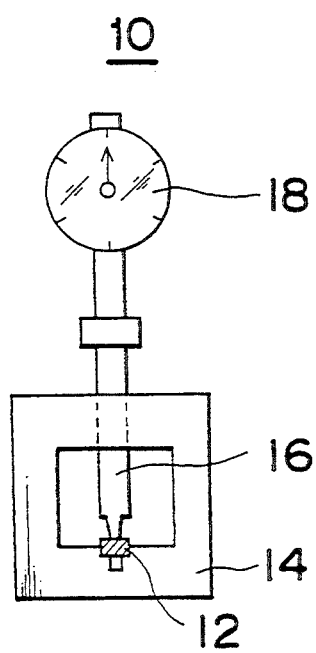

| No. | Sinter temp.(°C.) | Capacitance (μF) | tanδ (%) | bending strength(kg) | CR(Ω · F) before test | CR(Ω · F) after test | Δ C/C (%) DC25V |
|---|---|---|---|---|---|---|---|
| 11 | 990 | 8.2 | 1.9 | 10.8 | 165000 | 135000 | 49 |
| 25* | 960 | 10.2 | 2.4 | 9.7 | 153000 | 650 | 78 |

From the above results, it will be seen that the dielectric ceramic composition according to the present invention possesses high bending strength, and a small change rate of capacitance with applied DC voltage, as compared with the comparative specimen. Further, the insulation resistance is scarcely affected by the humidity aging test. Accordingly, it is possible with the dielectric ceramic composition of the present invention to produce monolithic ceramic capacitors with high reliability.

EXAMPLE 3

Using PBO, NiO, $NB_2O_5$, $TiO_2$, ZnO, $WO_3$, MgO, $BaCO_3$, $SrCO_3$, $CaCO_3$ and $MnO_2$ with a purity of not less than 99.9%, there were prepared test specimens in the following manner.

The raw materials were weighed and mixed in proportions shown in Table 4 to prepare mixture for a dielectric ceramic composition. The mixture was placed in a polyethylene pot along with agate balls and milled by the wet process for 10 hours. The slurry obtained was dehydrated, dried, and then put into an alumina sagger to calcine it at 650° to 800° C. for 2 hours.

The resultant calcined powder was crushed, added with 3 parts by weight of polyvinyl alcohol, milled again by the wet process, dried and then passed through a screen with 60 meshes to obtain granules for molding. The resultant granules were molded with an oil press under a pressure of 2000 Kg/cm² to prepare ceramic green disks with a diameter of 10 mm and a thickness of 1.0 mm.

The green disks were placed in an alumina sagger with zlrconia powder spread over its bottom, heated in air at 400° C. for 4 hours to remove the organic binder by combustion, and then fired at a sintering temperature shown in Table 5 for 2 hours to obtain ceramic disks. The ceramic disks were provided on its both sides with silver electrodes by applying a silver paste containing lead borosilicate glass frit and then baking it at 750° C. for 10 minutes to prepare specimens for measurements of electrical properties.

For each specimen, capacitance (C), dielectric loss (tan δ) and insulation resistance (IR) were measured in the same manner as Example 1. Results are shown in Table 5.

In Tables 4 and 5, specimens with an asterisk (*) are those out of the scope of the present invention.

TABLE 4

| No. | $Pb(Mg_{\frac{1}{3}}Nb_{\frac{2}{3}})O_3$ (mol %) | $PbTiO_3$ (mol %) | $Pb(Ni_{\frac{1}{3}}Nb_{\frac{2}{3}})O_3$ (mol %) | $Pb(Zn_{\frac{1}{2}}W_{\frac{1}{2}})O_3$ (mol %) | Substitant (mol %) | | Secondary component (wt %) $WO_3$ | $MnO_2$ |
|---|---|---|---|---|---|---|---|---|
| 29* | 3.0 | 13.0 | 50.0 | 34.0 | Ba | 0.5 | 0.05 | 0.0 |
| 30 | 78.5 | 19.0 | 1.5 | 1.0 | Sr | 1.5 | 6.00 | 0.0 |
| 31 | 93.0 | 4.0 | 2.0 | 1.0 | Ca | 7.5 | 6.00 | 0.0 |

TABLE 4-continued

| No. | Pb(Mg$_\frac{1}{3}$Nb$_\frac{2}{3}$)O$_3$ (mol %) | PbTiO$_3$ (mol %) | Pb(Ni$_\frac{1}{3}$Nb$_\frac{2}{3}$)O$_3$ (mol %) | Pb(Zn$_\frac{1}{2}$W$_\frac{1}{2}$)O$_3$ (mol %) | Substitant (mol %) | | Secondary component (wt %) WO$_3$ | MnO$_2$ |
|---|---|---|---|---|---|---|---|---|
| 32 | 48.3 | 15.5 | 21.7 | 14.5 | Sr | 5.0 | 2.50 | 0.0 |
| 33* | 37.3 | 1.0 | 36.7 | 25.0 | Ca | 6.0 | 1.00 | 0.0 |
| 34* | 4.0 | 36.0 | 51.0 | 9.0 | Ba | 8.5 | 3.00 | 0.0 |
| 35 | 36.3 | 32.5 | 18.7 | 12.5 | Ba | 10.0 | 2.50 | 0.0 |
| 36 | 4.0 | 11.0 | 51.0 | 34.0 | Ca | 0.8 | 0.05 | 0.0 |
| 37 | 47.3 | 18.0 | 21.2 | 13.5 | Sr | 9.0 | 2.50 | 0.0 |
| 38* | 96.0 | 1.5 | 1.5 | 1.0 | Ba | 5.5 | 8.00 | 0.0 |
| 39 | 60.0 | 19.0 | 11.0 | 10.0 | Sr | 5.0 | 3.50 | 0.0 |
| 40* | 79.5 | 19.0 | 0.5 | 1.0 | Ca | 7.5 | 8.00 | 0.0 |
| 41 | 51.3 | 17.5 | 18.7 | 12.5 | Ba | 1.0 | 2.50 | 0.0 |
| 42 | 53.8 | 15.0 | 18.7 | 12.5 | Ca | 3.5 | 8.00 | 0.0 |
| 43 | 36.0 | 1.5 | 37.5 | 25.0 | Sr | 4.0 | 0.05 | 0.0 |
| 44* | 37.0 | 2.0 | 56.0 | 5.0 | Sr | 9.5 | 4.00 | 0.0 |
| 45* | 15.0 | 34.2 | 50.0 | 0.8 | Ca | 6.0 | 7.00 | 0.0 |
| 46* | 23.0 | 30.0 | 10.0 | 37.0 | Ba | 6.5 | 6.00 | 0.0 |
| 47* | 78.5 | 19.0 | 1.5 | 1.0 | Ca | 2.0 | 0.00 | 0.0 |
| 48* | 92.0 | 4.0 | 3.0 | 1.0 | Sr | 10.0 | 8.50 | 0.0 |
| 49 | 44.3 | 17.0 | 23.2 | 15.5 | Ba | 5.5 | 3.00 | 0.1 |
| 50 | 44.3 | 17.0 | 23.2 | 15.5 | Ca | 5.5 | 3.00 | 0.2 |
| 51 | 44.3 | 17.0 | 23.2 | 15.5 | Sr | 5.5 | 3.00 | 0.5 |
| 52* | 44.3 | 17.0 | 23.2 | 15.5 | Sr | 5.5 | 0.00 | 1.0 |
| 53* | 60.0 | 19.0 | 11.0 | 10.0 | — | — | 3.50 | 0.0 |
| 54* | 60.0 | 19.0 | 11.0 | 10.0 | Ba | 11.0 | 3.50 | 0.0 |
| 55* | 60.0 | 19.0 | 11.0 | 10.0 | Ca | 10.5 | 3.50 | 0.0 |
| 56* | 60.0 | 19.0 | 11.0 | 10.0 | Sr | 11.0 | 3.50 | 0.0 |

TABLE 2

| No. | Sinter temp. (°C.) | ($\epsilon$) | tan$\delta$ (%) | specific resistance ($\Omega \cdot$ cm) 25° C. | 85° C. | TCC(%) −25° C. | −85° C. |
|---|---|---|---|---|---|---|---|
| 29* | 960 | 7400 | 3.0 | 9.0 × 10$^{11}$ | 6.7 × 10$^9$ | −32 | −51 |
| 30 | 1000 | 12400 | 2.0 | 1.1 × 10$^{13}$ | 9.3 × 10$^{11}$ | −52 | −22 |
| 31 | 1000 | 14800 | 1.2 | 2.0 × 10$^{13}$ | 9.1 × 10$^{11}$ | −50 | −55 |
| 32 | 970 | 11300 | 0.8 | 8.5 × 10$^{12}$ | 8.1 × 10$^{11}$ | −38 | −37 |
| 33* | 960 | 8500 | 0.4 | 7.4 × 10$^{12}$ | 1.9 × 10$^{11}$ | −37 | −51 |
| 34* | 970 | 6200 | 3.0 | 6.6 × 10$^{12}$ | 5.0 × 10$^{11}$ | −47 | −30 |
| 35 | 970 | 10600 | 0.6 | 9.5 × 10$^{12}$ | 6.7 × 10$^{11}$ | −20 | −54 |
| 36 | 960 | 11000 | 2.0 | 1.7 × 10$^{12}$ | 3.2 × 10$^{10}$ | −37 | −52 |
| 37 | 970 | 10500 | 0.6 | 7.9 × 10$^{12}$ | 3.2 × 10$^{10}$ | −28 | −55 |
| 38* | 1080 | 16800 | 0.5 | 3.3 × 10$^{13}$ | 7.3 × 10$^{11}$ | −35 | −68 |
| 39 | 990 | 12200 | 2.0 | 2.4 × 10$^{13}$ | 2.8 × 10$^{11}$ | −50 | −37 |
| 40* | 1000 | 16000 | 2.0 | 9.1 × 10$^{12}$ | 7.2 × 10$^{10}$ | −56 | −48 |
| 41 | 980 | 14800 | 1.0 | 9.7 × 10$^{12}$ | 8.5 × 10$^{10}$ | −40 | −52 |
| 42 | 980 | 13200 | 0.6 | 7.1 × 10$^{12}$ | 1.2 × 10$^{11}$ | −38 | −53 |
| 43 | 960 | 13500 | 1.3 | 5.3 × 10$^{12}$ | 4.3 × 10$^{10}$ | −41 | −53 |
| 44* | 990 | 7300 | 0.7 | 7.2 × 10$^{12}$ | 6.5 × 10$^{10}$ | −46 | −29 |
| 45* | 1100 | 8400 | 2.0 | 9.1 × 10$^{12}$ | 2.4 × 10$^{11}$ | −48 | −25 |
| 46* | 910 | 8100 | 2.0 | 8.9 × 10$^{10}$ | 1.0 × 10$^9$ | −52 | −31 |
| 47* | 1000 | 7300 | 1.7 | 8.7 × 10$^{12}$ | 7.9 × 10$^8$ | −45 | −25 |
| 48* | 1000 | 14100 | 0.7 | 1.6 × 10$^{11}$ | 1.4 × 10$^{10}$ | −23 | −58 |
| 49 | 980 | 14500 | 0.8 | 2.7 × 10$^{13}$ | 4.7 × 10$^{11}$ | −30 | −54 |
| 50 | 980 | 15200 | 0.5 | 3.0 × 10$^{13}$ | 9.2 × 10$^{10}$ | −32 | −55 |
| 51 | 980 | 12900 | 0.7 | 1.4 × 10$^{13}$ | 7.1 × 10$^9$ | −34 | −51 |
| 52* | 980 | 13400 | 0.8 | 1.0 × 10$^{10}$ | 8.6 × 10$^7$ | −26 | −50 |
| 53* | 960 | 14900 | 2.5 | 1.2 × 10$^{13}$ | 1.5 × 10$^{11}$ | −51 | −37 |
| 54* | 1050 | 9700 | 1.6 | 2.4 × 10$^{13}$ | 3.0 × 10$^{11}$ | −19 | −57 |
| 55* | 1050 | 9800 | 1.7 | 2.2 × 10$^{13}$ | 2.8 × 10$^{11}$ | −22 | −56 |
| 56* | 1050 | 9800 | 1.7 | 2.3 × 10$^{13}$ | 3.1 × 10$^{11}$ | −20 | −58 |

As will be understood from the data shown in Tables 4 and 5, all the specimens comprising the dielectric ceramic composition according to the present invention have a high dielectric constant of more than 10000, and a low dielectric dissipation factor (tan δ) of less than 2.0%. Further, they meet the E characteristics defined by JIS even though they have a high dielectric constant. Since they have a sintering temperature of less than 1000° C., it is possible to fire them at a low temperature.

In contrast therewith, a composition with the content of Pb(Mg$_\frac{1}{3}$Nb$_\frac{2}{3}$)O$_3$ less than 4.0 mol %, like specimen No. 29, provides a low dielectric constant of less than 10000 and a high dielectric dissipation factor exceeding 2.0%. Further, the composition with the content of Pb(Mg$_\frac{1}{3}$Nb$_\frac{2}{3}$)O$_3$ exceeding 93.0 mol %, like specimen No. 38, is poor in the temperature characteristics of capacitance, though it has a high dielectric constant.

The composition with the content of PbTiO$_3$ less than 1.5 mol %, like as specimen No. 33, provides a low dielectric constant less than 10000. The composition with a content of PbTiO$_3$ exceeding 35.0 mol %, like specimen No. 34, provides a low dielectric constant and a high dielectric dissipation factor of more than 2.0%.

In case of a composition with the content of Pb(Ni$_\frac{1}{3}$Nb$_\frac{2}{3}$)O$_3$ less than 1.5 mol %, like specimen No. 40, the temperature coefficient of capacitance does not meet the requirements of E characteristics defined by JIS, though the dielectric constant becomes large. The composition with a content of Pb(Ni$_\frac{1}{3}$Nb$_\frac{2}{3}$)O$_3$ more than 51.0 mol %, like as specimen No. 44, provides a low dielectric constant of less than 10000.

The composition with a content of Pb(Zn$_\frac{1}{2}$W$_\frac{1}{2}$)O$_3$ less than 1.0 mol %, like specimen No. 45, has a sintering temperature higher than 1000° C. and provides a low dielectric constant less than 10000. The composition with a content of Pb(Zn$_\frac{1}{2}$W$_\frac{1}{2}$)O$_3$ of more than 34.0 mol %, like specimen No. 46, provides a low dielectric constant less than 10000 and a low specific resistance less than 10$^{12}$ Ω·cm at room temperature, though its sintering temperature is less than 1000° C.

The composition containing less than 0.1 mol % of the substituent, like as specimen No. 53, provides a high dielectric dissipation factor exceeding 2.0%. The composition containing more than 10.0 mol % of the substituent, like as specimens Nos. 54, 55 and 56, has a high sintering temperature more than 1000° C. and provides a low dielectric constant less than 10000 and poor temperature coefficient of capacitance which does not meet the requirements of E characteristics defined by JIS.

The composition with a content of W being less than 0.05 parts by weight in terms of WO$_3$, like specimen No. 47, provides a low dielectric constant less than 10000. The composition with a content of W being more than 8.0 parts by weight in terms of WO$_3$, like specimen No. 48, provides poor temperature coefficient of capacitance which does not meet the requirements of E characteristics defined by JIS, and a low specific resistance less than 10$^{12}$ Ω·cm, though it provides a high dielectric constant.

Finally, a composition with the content of Mn exceeding 0.5 parts by weight in terms of MnO$_2$, like specimen No. 52, provides a low specific resistance less than 10$^{12}$ Ω·cm an room temperature.

EXAMPLE 4

Using the calcined powder prepared in Example 3 for the specimens Nos. 39 and 53, there were prepared monolithic ceramic capacitors in the same manner as Example 2. The dimensions of the monolithic ceramic capacitors were: 1.6 mm in width, 3.2 mm in length, 1.2 mm in thickness. Each dielectric layer is 13 μm in thickness, the number of dielectric layers is 10, and effective surface area of internal electrode is 2.1 mm$^2$.

For each specimen, capacitance (C), dielectric dissipation factor (tan δ), insulation resistance (IR), bending strength and change rate of capacitance were measured in determined in the same manner as Example 2. The results are shown in Table 6 together with the sintering temperature.

TABLE 6

| No. | Sinter temp.(°C.) | Capacitance (μF) | tanδ (%) | bending strength(kg) | CR(Ω · F) before test | CR(Ω · F) after test | Δ C/C (%) DC25V |
|---|---|---|---|---|---|---|---|
| 39 | 990 | 8.6 | 2.0 | 10.5 | 180000 | 150000 | 48 |
| 53* | 960 | 10.5 | 2.5 | 9.7 | 126000 | 700 | 78 |

EXAMPLE 5

Using PbO, NiO, Nb$_2$O$_5$, TiO$_2$, ZnO, WO$_3$, MgO, BaCO$_3$, SrCO$_3$, CaCO$_3$ and MnO$_2$ with a purity of not less than 99.9%, there were prepared test specimens in the following manner.

The raw materials were weighed and mixed in proportions shown in Table 7 to prepare mixture for a dielectric ceramic composition. The mixture was placed in a polyethylene pot along with agate balls and milled by the wet process for 10 hours. The slurry obtained was dehydrated, dried, and then put into an alumina sagger to calcine it at 650° to 800° C. for 2 hours.

The resultant calcined powder was crushed, added with 3 parts by weight of polyvinyl alcohol, milled again by the wet process, dried and then passed through a screen with 60 meshes to obtain granules for molding. The resultant granules were molded with an oil press under a pressure of 2000 Kg/cm$^2$ to prepare ceramic green disks with a diameter of 10 mm and a thickness of 1.0 mm.

The green disks were placed in an alumina sagger with zirconia powder spread over its bottom, heated in air at 400° C. for 4 hours to remove the organic binder by combustion, and then fired an a sintering temperature shown in Table 8 for 2 hours to obtain ceramic disks. The ceramic disks were provided on its both sides with silver electrodes by applying a silver paste containing lead borosilicane glass frit and then baking it at 750° C. for 10 minutes to prepare specimens for measurements of electrical properties.

For each specimen, capacitance (C), dielectric loss (tan δ) and insulation resistance (IR) were measured in the same manner as Example 1. Results are shown in Table 8.

In Tables 7 and 8, specimens with an asterisk (*) are those out of the scope of the present invention.

TABLE 7

| No. | Pb(Mg$_\frac{1}{3}$Nb$_\frac{2}{3}$)O$_3$ (mol %) | PbTiO$_3$ (mol %) | Pb(Ni$_\frac{1}{3}$Nb$_\frac{2}{3}$)O$_3$ (mol %) | Pb(Zn$_\frac{1}{2}$W$_\frac{1}{2}$)O$_3$ (mol %) | A/B | Substitant (mol %) | | Secondary component (wt %) MgO | Secondary component (wt %) MnO$_2$ |
|---|---|---|---|---|---|---|---|---|---|
| 57* | 3.0 | 13.0 | 50.0 | 34.0 | 1.005 | Ba | 0.5 | 1.00 | 0.0 |
| 58 | 78.5 | 19.0 | 1.5 | 1.0 | 1.010 | Sr | 1.5 | 0.05 | 0.0 |
| 59 | 93.0 | 4.0 | 2.0 | 1.0 | 1.020 | Ca | 8.0 | 1.50 | 0.0 |
| 60 | 48.3 | 15.5 | 21.7 | 14.5 | 1.005 | Sr | 5.5 | 2.00 | 0.0 |
| 61* | 37.3 | 1.0 | 36.7 | 25.0 | 1.010 | Ba | 6.5 | 3.00 | 0.0 |
| 62* | 4.0 | 36.0 | 51.0 | 9.0 | 1.000 | Ca | 8.5 | 2.00 | 0.0 |
| 63 | 36.3 | 32.5 | 18.7 | 12.5 | 1.000 | Sr | 10.0 | 2.50 | 0.0 |
| 64 | 4.0 | 11.0 | 51.0 | 34.0 | 1.005 | Ba | 1.5 | 3.50 | 0.0 |
| 65 | 47.3 | 18.0 | 21.2 | 13.5 | 1.010 | Ca | 1.0 | 3.00 | 0.0 |
| 66* | 96.0 | 1.5 | 1.5 | 1.0 | 1.000 | Sr | 6.0 | 1.00 | 0.0 |
| 67 | 60.0 | 19.0 | 11.0 | 10.0 | 1.000 | Ba | 5.5 | 1.50 | 0.0 |
| 68* | 79.5 | 19.0 | 0.5 | 1.0 | 1.020 | Ca | 7.5 | 3.00 | 0.0 |
| 69 | 51.3 | 17.5 | 18.7 | 12.5 | 1.010 | Sr | 1.0 | 3.00 | 0.0 |
| 70 | 53.8 | 15.0 | 18.7 | 12.5 | 1.000 | Ba | 3.5 | 5.00 | 0.0 |
| 71 | 36.0 | 1.5 | 37.5 | 25.0 | 1.000 | Ba | 4.5 | 1.00 | 0.0 |

TABLE 7-continued

| No. | $Pb(Mg_{\frac{1}{3}}Nb_{\frac{2}{3}})O_3$ (mol %) | $PbTiO_3$ (mol %) | $Pb(Ni_{\frac{1}{3}}Nb_{\frac{2}{3}})O_3$ (mol %) | $Pb(Zn_{\frac{1}{2}}W_{\frac{1}{2}})O_3$ (mol %) | A/B | Substitant (mol %) | | Secondary component (wt %) MgO | $MnO_2$ |
|---|---|---|---|---|---|---|---|---|---|
| 72* | 37.0 | 2.0 | 56.0 | 5.0 | 1.005 | Ba | 9.5 | 0.05 | 0.0 |
| 73* | 15.0 | 34.2 | 50.0 | 0.8 | 1.010 | Ca | 6.0 | 4.00 | 0.0 |
| 74* | 23.0 | 30.0 | 10.0 | 37.0 | 1.000 | Sr | 7.0 | 3.00 | 0.0 |
| 75* | 78.5 | 19.0 | 1.5 | 1.0 | 1.010 | Sr | 2.0 | 0.00 | 0.0 |
| 76* | 92.0 | 4.0 | 3.0 | 1.0 | 1.020 | Ca | 10.0 | 6.00 | 0.0 |
| 77 | 44.3 | 17.0 | 23.2 | 15.5 | 1.005 | Ca | 5.0 | 1.00 | 0.1 |
| 78 | 44.3 | 17.0 | 23.2 | 15.5 | 1.010 | Sr | 5.0 | 1.00 | 0.2 |
| 79 | 44.3 | 17.0 | 23.2 | 15.5 | 1.000 | Ba | 5.0 | 1.00 | 0.5 |
| 80* | 44.3 | 17.0 | 23.2 | 15.5 | 1.010 | Sr | 5.0 | 1.00 | 1.0 |
| 81* | 60.0 | 19.0 | 11.0 | 10.0 | 1.005 | — | — | 1.00 | 0.0 |
| 82* | 60.0 | 19.0 | 11.0 | 10.0 | 1.005 | Ba | 11.0 | 1.00 | 0.0 |
| 83* | 60.0 | 19.0 | 11.0 | 10.0 | 1.000 | Sr | 10.5 | 1.00 | 0.0 |
| 84* | 60.0 | 19.0 | 11.0 | 10.0 | 1.000 | Ca | 10.5 | 1.00 | 0.0 |
| 85* | 60.0 | 19.0 | 11.0 | 10.0 | 1.040 | Ba | 5.5 | 1.00 | 0.0 |
| 86 | 60.0 | 19.0 | 11.0 | 10.0 | 1.030 | Ba | 5.5 | 1.00 | 0.0 |
| 87 | 60.0 | 19.0 | 11.0 | 10.0 | 0.990 | Ba | 5.5 | 1.00 | 0.0 |
| 88* | 60.0 | 19.0 | 11.0 | 10.0 | 0.980 | Ba | 5.5 | 1.00 | 0.0 |

TABLE 8

| No. | Sinter temp. (°C.) | ($\epsilon$) | tan$\delta$ (%) | specific resistance ($\Omega \cdot cm$) 25° C. | 85° C. | TCC(%) −25° C. | −85° C. |
|---|---|---|---|---|---|---|---|
| 57* | 960 | 7400 | 3.0 | $8.02 \times 10^{11}$ | $7.7 \times 10^9$ | −30 | −49 |
| 58 | 1030 | 13300 | 2.0 | $3.5 \times 10^{11}$ | $9.0 \times 10^{11}$ | −52 | −34 |
| 59 | 1050 | 15400 | 1.1 | $3.5 \times 10^{13}$ | $8.3 \times 10^{11}$ | −47 | −51 |
| 60 | 980 | 12400 | 0.7 | $2.5 \times 10^{13}$ | $8.0 \times 10^{11}$ | −30 | −45 |
| 61* | 970 | 7700 | 0.4 | $6.9 \times 10^{12}$ | $1.9 \times 10^{11}$ | −33 | −49 |
| 62* | 1000 | 6300 | 3.1 | $7.6 \times 10^{12}$ | $4.5 \times 10^{11}$ | −45 | −30 |
| 63 | 1000 | 14900 | 0.3 | $2.0 \times 10^{13}$ | $6.1 \times 10^{11}$ | −20 | −52 |
| 64 | 960 | 10300 | 2.0 | $1.4 \times 10^{12}$ | $3.6 \times 10^{10}$ | −37 | −50 |
| 65 | 980 | 13800 | 0.6 | $3.0 \times 10^{13}$ | $8.0 \times 10^{11}$ | −26 | −54 |
| 66* | 1120 | 17300 | 0.7 | $3.4 \times 10^{13}$ | $8.4 \times 10^{11}$ | −42 | −60 |
| 67 | 990 | 11400 | 1.9 | $3.7 \times 10^{13}$ | $1.8 \times 10^{11}$ | −50 | −41 |
| 68* | 1030 | 16700 | 2.3 | $1.7 \times 10^{13}$ | $7.0 \times 10^{10}$ | −58 | −50 |
| 69 | 990 | 12300 | 0.4 | $2.0 \times 10^{13}$ | $7.5 \times 10^{10}$ | −34 | −46 |
| 70 | 980 | 14600 | 0.4 | $8.5 \times 10^{12}$ | $1.1 \times 10^{11}$ | −38 | −50 |
| 71 | 960 | 11600 | 1.1 | $6.1 \times 10^{12}$ | $4.8 \times 10^{10}$ | −35 | −52 |
| 72* | 1070 | 6000 | 0.6 | $5.9 \times 10^{12}$ | $5.2 \times 10^{10}$ | −38 | −40 |
| 73* | 1130 | 7500 | 2.1 | $1.8 \times 10^{13}$ | $3.3 \times 10^{10}$ | −44 | −34 |
| 74* | 920 | 8100 | 1.9 | $7.7 \times 10^{10}$ | $8.2 \times 10^8$ | −47 | −31 |
| 75* | 1030 | 7700 | 1.6 | $8.4 \times 10^{12}$ | $7.9 \times 10^9$ | −42 | −26 |
| 76* | 1050 | 15000 | 0.8 | $9.6 \times 10^{11}$ | $3.6 \times 10^{11}$ | −50 | −60 |
| 77 | 980 | 13100 | 0.6 | $2.1 \times 10^{13}$ | $3.0 \times 10^{12}$ | −27 | −52 |
| 78 | 980 | 13800 | 0.5 | $3.3 \times 10^{12}$ | $5.0 \times 10^{12}$ | −35 | −54 |
| 79 | 980 | 12600 | 0.7 | $2.6 \times 10^{13}$ | $1.4 \times 10^{12}$ | −41 | −50 |
| 80* | 980 | 12900 | 0.9 | $7.1 \times 10^{10}$ | $7.9 \times 10^8$ | −43 | −49 |
| 81* | 960 | 13000 | 2.4 | $4.2 \times 10^{13}$ | $2.1 \times 10^{11}$ | −48 | −46 |
| 82* | 1120 | 9800 | 1.6 | $4.0 \times 10^{13}$ | $2.3 \times 10^{11}$ | −22 | −60 |
| 83* | 1120 | 9200 | 1.7 | $3.8 \times 10^{13}$ | $2.4 \times 10^{11}$ | −20 | −59 |
| 84* | 1120 | 9700 | 1.6 | $3.5 \times 10^{13}$ | $2.5 \times 10^{11}$ | −21 | −60 |
| 85* | 970 | 12100 | 2.2 | $9.5 \times 10^{12}$ | $5.2 \times 10^9$ | −56 | −48 |
| 86 | 970 | 12000 | 2.0 | $9.8 \times 10^{12}$ | $8.6 \times 10^{10}$ | −55 | −48 |
| 87 | 1000 | 11800 | 2.0 | $1.1 \times 10^{13}$ | $1.4 \times 10^{11}$ | −49 | −45 |
| 88* | 1120 | 9600 | 1.9 | $8.7 \times 10^{12}$ | $9.1 \times 10^{10}$ | −48 | −40 |

As will be understood from the data shown in Tables 7 and 8, all the specimens comprising the dielectric ceramic composition according to the present invention have a high dielectric constant of more than 10000, and a low dielectric dissipation factor (tan δ) of less than 2.0%. Further, they meet the E characteristics defined by JIS even though they have a high dielectric constant. since they have a sintering temperature of less than 1050° C., it is possible to fire them at a low temperature.

In contrast therewith, a composition with the content of $Pb(Mg_{\frac{1}{3}}Nb_{\frac{2}{3}})O_3$ less than 4.0 mol %, like specimen No. 57, provides a low dielectric constant of less than 10000 and a high dielectric dissipation factor exceeding 2.0%. Further, a composition with the content of $Pb(Mg_{\frac{1}{3}}Nb_{\frac{2}{3}})O_3$ exceeding 93.0 mol %, like specimen No. 66, is poor in the temperature characteristics of capacitance, though it has a high dielectric constant.

The composition with a content of $PbTiO_3$ less than 1.5 mol %, like specimen No. 61, provides a low dielectric constant less than 10000. The composition with content of $PbTiO_3$ exceeding 35.0 mol %, like specimen No. 62, provides a low dielectric constant and a high dielectric dissipation factor of more than 2.0%.

In case of a composition with the content of $Pb(Ni_{\frac{1}{3}}Nb_{\frac{2}{3}})O_3$ less than 1.5 mol %, like specimen No. 68, the temperature coefficient of capacitance does not meet the requirements of E characteristics defined by JIS, though the dielectric constant becomes large. The composition with a content of $Pb(Ni_{\frac{1}{3}}Nb_{\frac{2}{3}})O_3$ more than 51.0 mol %, like specimen No. 72, provides a low dielectric constant of less than 10000.

The composition with a content of $Pb(Zn_{\frac{1}{2}}W_{\frac{1}{2}})O_3$ less than 1.0 mol %, like specimen No. 73, has a sintering temperature higher than 1050° C. and provides a low dielectric constant less than 10000. The composition with a content of $Pb(Zn_{\frac{1}{2}}W_{\frac{1}{2}})O_3$ of more than 34.0 mol %, like specimen No. 74, provides a low dielectric constant less than 10000 and a low specific resistance less than $10^{12}$ Ω·cm at room temperature, though its sintering temperature becomes less than 1050° C.

The composition containing the substituent in an amount of less than 0.1 mol %, like as specimen No. 81, provides a high dielectric dissipation factor exceeding 2.0%. The composition containing the substituent in an amount of more than 10.0 mol %, like specimens Nos. 82, 83 and 84, has a high sintering temperature more than 1050° C. and provides a low dielectric constant less than 10000 and poor temperature coefficient of capacitance which does not meet the requirements of E characteristics defined by JIS.

The composition with the ratio A/B being less than 0.99, like specimen No. 88, has a sintering temperature higher than 1050° C. and a low dielectric constant less than 10000. The composition with the ratio A/B being more than 1.03, like specimen No. 85, possesses a high dielectric dissipation factor exceeding 2.0% and provides poor temperature coefficient of capacitance which does not meet the requirements of E characteristics defined by JIS.

The composition with a content of Mg being less than 0.05 parts by weight in terms of MgO, like specimen No. 75, provides a low dielectric constant less than 10000. The composition with a content of MgO being more than 5.00 parts by weight in terms of MgO, like specimen No. 76, provides poor temperature coefficient of capacitance which does not meet the requirement of E characteristics defined by JIS, and a low specific resistance less than $10^{12}$ Ω·cm, though it provides a high dielectric constant.

Finally, the composition with the content of Mn exceeding 0.5 parts by weight in terms of $MnO_2$, like specimen No. 80, provides a low specific resistance less than $10^{12}$ Ω·cm at room temperature.

EXAMPLE 6

Using the calcined powder prepared in Example 5 for the specimens Nos. 69 and 79, there were prepared monolithic ceramic capacitors in the same manner as Example 2. The dimensions of the monolithic ceramic capacitors were: 1.6 mm in width, 3.2 mm in length, 1.2 mm in thickness. Each dielectric layer is 13 μm in thickness, the number of effective dielectric layers is 12, and effective surface area of each internal electrode is 2.1 $mm^2$.

For each specimen, capacitance (C), dielectric dissipation factor (tan δ), insulation resistance (IR), deflection strength and change rate of capacitance were mreased in determined in the same manner as Example 2. The results are shown in Table 9 together with the sintering temperature. The CR product is given by the mean value of 30 test pieces and the minimum value (MIN).

change rate of capacitance with applied DC voltage, as compared with the comparative specimen. Further, the insulation resistance is scarcely affected by the humidity aging test. Accordingly, it is possible with the dielectric ceramic composition of the present invention to produce monolithic ceramic capacitors with high reliability.

What is claimed is:

1. A dielectric ceramic composition consisting essentially of:

a main component of a four component system, $Pb(Mg_{\frac{1}{3}}Nb_{\frac{2}{3}})O_3$—$PbTiO_3$—$Pb(Ni_{\frac{1}{3}}Nb_{\frac{2}{3}})O_3$—$Pb(Zn_{\frac{1}{2}}W_{\frac{1}{2}})O_3$, of which a part of Pb is replaced with at least one substituent selected from the group consisting of Ba, Ca and Sr, said main component consisting essentially of 4.0 to 93.0 mol % of $Pb(Mg_{\frac{1}{3}}Nb_{\frac{2}{3}})O_3$, 1.5 to 35.0 mol % of $PbTiO_3$, 1.5 to 51.0 mol % of $Pb(Ni_{\frac{1}{3}}Nb_{\frac{2}{3}})O_3$, and 1.0 to 34.0 mol % of $Pb(Zn_{\frac{1}{2}}W_{\frac{1}{2}})O_3$, the amount of said at least one substituent for Pb being 0.1 to 10 mol %; and a secondary component selected from the group consisting of W, Zn and Mg, said secondary component being incorporated in said main component in an amount of 0.05 to 10.0 parts by weight per 100 parts by weight of said main component in terms of each oxide, $WO_3$, ZnO or MgO.

2. The dielectric ceramic composition according to claim 1, wherein the molar ratio of the A site to the B site in the main component being in the range of 0.99 to 1.03 inclusive when said main component is expressed by the general formula: $ABO_3$, where A represents $(Pb_{1-a}M_a)$, B represents $\{(Mg_{\frac{1}{3}}Nb_{\frac{2}{3}})_xTi_y(Ni_{\frac{1}{3}}Nb_{\frac{2}{3}})_z(Zn_{\frac{1}{2}}W_{\frac{1}{2}})_{1-x-y-z}\}$, $0.001 \leq a \leq 0.100$, $0.040 \leq x \leq 0.930$, $0.015 \leq y \leq 0.350$, and $0.015 \leq z \leq 0.510$.

3. The dielectric ceramic composition according to claim 2, wherein said secondary component further contains Mn in an amount of not more than 0.5 parts by weight per 100 parts by weight of said main component in terms of $MnO_2$.

4. The dielectric ceramic composition according to claim 2, wherein the secondary component is W and is incorporated in said main component in an amount of 0.05 to 8.0 parts by weight per 100 parts by weight of said main component in terms of $WO_3$.

5. The dielectric ceramic composition according to claim 4, wherein said secondary component further contains Mn in an amount of not more than 0.5 parts by weight per 100 parts by weight of said main component in terms of $MnO_2$.

6. The dielectric ceramic composition according to claim 2, wherein said secondary component is Zn incorporated in said main component in an amount of 0.1 to 10.0 parts by weight per 100 parts by weight of said main component in terms of ZnO.

7. The dielectric ceramic composition according to claim 6, wherein said secondary component further

TABLE 9

| No. | Sinter temp.(°C.) | Capacitance (μF) | tanδ (%) | bending strength(kg) | CR(Ω · F) before test X | CR(Ω · F) before test MIN | CR(Ω · F) after test X | CR(Ω · F) after test MIN | Δ C/C(%) DC25V |
|---|---|---|---|---|---|---|---|---|---|
| 69 | 990 | 0.22 | 0.8 | 11.9 | 88000 | 84000 | 85000 | 80000 | −48 |
| 79 | 980 | 0.25 | 1.0 | 12.1 | 90000 | 85000 | 87000 | 83000 | −48 |

From the above results, it will be seen that the dielectric ceramic composition according to the present invention possesses high bending strength, and a small contains Mn in an amount of not more than 0.5 parts by weight per 100 parts by weight of said main component in terms of $MnO_2$.

8. The dielectric ceramic composition according to claim 2, wherein said secondary component is Mg incorporated in said main component in an amount of 0.05 to 5.00 parts by weight per 100 parts by weight of said main component in terms of Mg.

9. The dielectric ceramic composition according to claim 8, wherein said secondary component further contains Mn in an amount of not more than 0.5 parts by weight per 100 parts by weight of said main component in terms of $MnO_2$.

10. The dielectric ceramic composition according to claim 1, wherein said secondary component further contains Mn in an amount of not more than 0.5 parts by weight per 100 parts by weight of said main component in terms of $MnO_2$.

11. A dielectric ceramic composition consisting essentially of:
a main component of a four component system, $Pb(Mg_{\frac{1}{3}}Nb_{\frac{2}{3}})O_3$—$PbTiO_3$—$Pb(Ni_{\frac{1}{3}}Nb_{\frac{2}{3}})O_3$—$Pb(Zn_{\frac{1}{2}}W_{\frac{1}{2}})O_3$, of which a part of Pb is replaced with at least one substituent selected from the group consisting of Ba, Ca and Sr, said main component consisting essentially of 4.0 to 93.0 mol % of $Pb(Mg_{\frac{1}{3}}Nb_{\frac{2}{3}})O_3$, 1.5 to 35.0 mol % of $PbTiO_3$, 1.5 to 51.0 mol % of $Pb(Ni_{\frac{1}{3}}Nb_{\frac{2}{3}})O_3$, and 1.0 to 34.0 mol % of $Pb(Zn_{\frac{1}{2}}W_{\frac{1}{2}})O_3$, the amount of said at least one substituent for Pb being 0.1 to 10 mol %; and
a secondary component composed of W and incorporated in said main component in an amount of 0.05 to 8.0 parts by weight per 100 parts by weight of said main component in terms of $WO_3$.

12. A dielectric ceramic composition consisting essentially
a main component of a four component system, $Pb(Mg_{\frac{1}{3}}Nb_{\frac{2}{3}})O_3$—$PbTiO_3$—$Pb(Ni_{\frac{1}{3}}Nb_{\frac{2}{3}})O_3$—$Pb(Zn_{\frac{1}{2}}W_{\frac{1}{2}})O_3$, of which a part of Pb is replaced with at least one substituent selected from the group consisting of Ba, Ca and Sr, said main component consisting essentially of 4.0 to 93.0 mol % of $Pb(Mg_{\frac{1}{3}}Nb_{\frac{2}{3}})O_3$, 1.5 to 35.0 mol % of $PbTiO_3$, 1.5 to 51.0 mol % of $Pb(Ni_{\frac{1}{3}}Nb_{\frac{2}{3}})O_3$, and 1.0 to 34.0 mol % of $Pb(Zn_{\frac{1}{2}}W_{\frac{1}{2}})O_3$, the amount of said at least one substituent for Pb being 0.1 to 10 mol %; and
a secondary component composed of Zn and incorporated in said main component in an amount of 0.1 to 10.0 parts by weight per 100 parts by weight of said main component in terms of ZnO.

13. A dielectric ceramic composition consisting essentially of:
a main component of a four component system, $Pb(Mg_{\frac{1}{3}}Nb_{\frac{2}{3}})O_3$—$PbTiO_3$—$Pb(Ni_{\frac{1}{3}}Nb_{\frac{2}{3}})O_3$—$Pb(Zn_{\frac{1}{2}}W_{\frac{1}{2}})O_3$, of which a part of Pb is replaced with at least one substituent selected from the group consisting of Ba, Ca and Sr, said main component consisting essentially of 4.0 to 93.0 mol % of $Pb(Mg_{\frac{1}{3}}Nb_{\frac{2}{3}})O_3$, 1.5 to 35.0 mol % of $PbTiO_3$, 1.5 to 51.0 mol % of $Pb(Ni_{\frac{1}{3}}Nb_{\frac{2}{3}})O_3$, and 1.0 to 34.0 mol % of $Pb(Zn_{\frac{1}{2}}W_{\frac{1}{2}})O_3$, the amount of said at least one substituent for Pb being 0.1 to 10 mol %; and
a secondary component composed of Mg and incorporated in said main component in an amount of 0.05 to 5.00 parts by weight per 100 parts by weight of said main component in terms of MgO.

* * * * *